United States Patent [19]

Tsuchiya

[11] 4,235,981
[45] Nov. 25, 1980

[54] COATING COMPOSITIONS
[75] Inventor: Shozo Tsuchiya, Kawasaki, Japan
[73] Assignee: Nippon Oil Co., Ltd., Tokyo, Japan
[21] Appl. No.: 941,884
[22] Filed: Sep. 13, 1978

Related U.S. Application Data

[63] Continuation of Ser. No. 711,049, Aug. 2, 1976, abandoned.

[30] Foreign Application Priority Data

Aug. 5, 1975 [JP] Japan .................................. 50/94691
Aug. 5, 1975 [JP] Japan .................................. 50/94692

[51] Int. Cl.$^2$ .......................................... C08F 277/00
[52] U.S. Cl. ............................... 525/244; 260/29.7 T; 260/29.7 UA; 525/251; 525/290
[58] Field of Search .............. 260/29.4 UA, 29.7 UA, 260/29.7 T, 885; 526/283, 16; 525/329, 290, 244, 259

[56] References Cited

U.S. PATENT DOCUMENTS

| | | | |
|---|---|---|---|
| 2,671,070 | 3/1954 | Knapp | 260/45.4 |
| 3,717,557 | 2/1973 | Peterson et al. | 260/885 |
| 3,900,440 | 8/1975 | Ohara et al. | 260/29.7 |
| 3,954,912 | 5/1976 | Werner et al. | 260/42 |

Primary Examiner—Hosea E. Taylor
Assistant Examiner—Amelia B. Yarbrough
Attorney, Agent, or Firm—Jordan and Hamburg

[57] ABSTRACT

Coating compositions which are free of volatile organic solvents and curable under the action of heat or radiation without undesirable evaporation of organic solvents, prepared by reacting a copolymer resin of a cyclopentadiene type compound such as dicyclopentadiene and maleic anhydride, with at least one compound represented by the formula

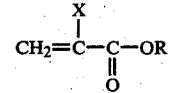

or the like wherein X is H or —CH$_3$ and R is —CH$_2$CH$_2$OH or the like to produce a resin which is then dissolved in a reactive solvent such as a (meth)acrylate type monomer or ammonia water; and a process for preparing the coating compositions.

18 Claims, No Drawings

COATING COMPOSITIONS

This is a continuation of Ser. No. 711,049 filed Aug. 2, 1976, now abandoned.

This invention relates to a novel coating composition and more particularly to a novel non-aqueous or aqueous volatile organic solvent free or aqueous coating composition which is free of a volatile organic solvent and is curable under the action of heat or radiation without undesirable evaporation of organic solvents.

With the recent progress of printing techniques it has been required that printing speed be increased. Accordingly, printing inks which may be dried or cured rapidly have been sought increasingly eagerly. In the practice of conventional high-speed printing with a printing ink, a direct-fire or hot-air drying or curing method has been employed as a means for the acceleration of the drying or curing of the printing ink used for the printing. Printing inks used in such heat set printing are dried by heating to evaporate a solvent contained in an amount of 30-40 wt.% therein. Therefore, in print shops in which heat set printing is effected, a part of the vapor of a solvent used is discharged thereby raising a problem of environmental pollution in many cases. Thus, printing inks which are free of organic volatile matter and capable of drying rapidly, are sought by those in the art.

Furthermore, gravure printing has recently been remarkably developed not only in the publishing world but also in the field of packaging, building material manufacturing and other industries. This is because, as compared with other known printing methods, gravure printing is very advantageous in that it is excellent in high-speed printability and gradation reproducibility and is also widely applicable to the printing on various materials to be printed. Gravure printing would hereafter be employed more widely as a printing method. The greater part of the known gravure printing inks are solvent type inks containing a solution of a natural or synthetic resin in an organic solvent. They therefore involve dangers of the toxicity, ignition, explosion and the like of the organic solvent when they are manufactured and handled. Thus there have recently been sought volatile organic solvent-free or aqueous printing inks which are harmless and safe from the view-point of disaster prevention.

As printing inks which may dry without being accompanied with the evaporation of an organic solvent from the inks, there have already been known several inks such as ultraviolet rays-curable type inks and heat-curable solvent-free type inks. More particularly, the known printing inks include heat-curable inks in which aminoplast is combined with an ester (British Pat. No. 1,234,444), and ultraviolet rays-curable inks (Japanese Patent Gazatte No. 10606/57) containing an acryl-modified epoxy resin (Japanese Patent Laying-Open Gazette No. 15202/72) and tung oil which are reactive due to their double bonds. However, none of the conventional solvent-free printing inks are satisfactory because of their insufficiently high curing rate or speed. Aqueous printing inks containing no volatile organic solvent which have heretofore been developed are those containing, as a vehicle, a maleic resin, shellac or a copolymer resin mainly of acrylic or maleic acid. The aqueous printing inks as mentioned above are commonly disadvantageous in that they will exhibit inferior water resistance after printing on the surface of a material and then cured.

The present inventors had made intensive studies in attempts to find coating compositions which are curable rapidly under the action of heat or ultraviolet rays and suitable for use as a vehicle for solvent free or aqueous printing inks and, as a result of their studies, they have found such coating compositions.

The primary object of this invention is to provide novel coating compositions.

This object is achieved by reacting a copolymer resin of a cyclopentadiene type compound (such as dicyclopentadiene) and maleic anhydride, with at least one compound represented by the following general formula (1) or (2)

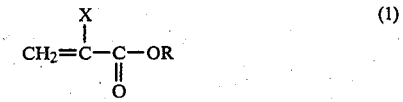

or

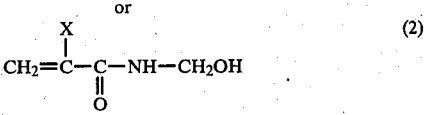

wherein X is H or —CH₃ and R is —CH₂CH₂OH, —CH₂CHOH with CH₃, or

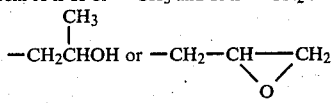

to produce a resin which is then dissolved in a reactive solvent such as (meth)acrylate monomer or ammonia water thereby to obtain a desired coating composition curable under the action of heat or radiation and capable of forming a waterproof coating thereof.

This invention will be further detailed hereinbelow.

The starting copolymer resins which may be used in this invention include those which are prepared by copolymerizing maleic anhydride with at least one cyclopentadiene type compound selected from the group consisting of cyclopentadiene, dicyclopentadiene, tricyclopentadiene, tetracyclopentadiene and their substitution products containing at least one lower alkyl group having 1-3 carbon atoms (the substitution products being methyldicyclopentadiene for example).

The starting copolymer resins of the cyclopentadiene type compound and maleic anhydride are obtained by reacting the cyclopentadiene type compound with maleic anhydride at 150°-350° C. in the presence or absence of a radical polymerizing catalyst and, if desired, in the presence of a solvent. The molar ratio of the cyclopentadiene type compound to maleic anhydride used for the reaction may be in the range of from 30:70-99.9:0.1, preferably from 40:60 to 80:20. The copolymer resins are normally solid ones and they can be produced with a desired softening point by varying reaction conditions such as reaction time and temperature depending on the purpose for which they are used. The softening point of the copolymer resins is usually varied from 50° to 250° C. It is not necessarily required in the production of the said resins that the cyclopentadiene type compound be of good purity. There may be used dicyclopentadiene of about 85% purity which is obtained for example by heating a C₅ fraction produced as by-products by the thermal cracking of naphtha or the like to dimerize cyclopentadiene and methylcyclopentadiene contained in the C₅ fraction and then distilling the thus treated fraction to remove therefrom the greater part of the remaining C₅ fraction such as C₅ olefins and C$_5$ paraffins thereby obtaining dicyclopentadiene of about 85% purity.

According to this invention, the aforesaid starting copolymer resin is then reacted with at least one compound of the aforementioned formula (1) or (2) under usual esterifying reaction conditions in the presence or absence of a catalyst to esterify the acid anhydride groups of the copolymer resin thereby obtaining an esterified copolymer resin. In the practice of this esterification the specific compound of the formula (1) or (2) may be used in amounts of 0.5–2 mol, preferably 0.5–1.5 mol, per mol of the acid anhydride group of the esterified copolymer resin; however, it is preferable to use the specific compound in amounts sufficient to effect a substantially complete esterification. The use of less than 0.5 mol of the specific compound will result in the production of an esterified copolymer resin which is curable at an undesirably low curing rate or speed; furthermore, an aqueous coating composition containing said undesirable esterified copolymer resin as the vehicle, will not exhibit satisfactory water resistance after cured under the action of heat or radiation.

The esterified copolymer resins are dissolved in a reactive solvent such as a (meth)acrylate type monomer to obtain a coating composition of this invention, or they are dissolved in a reactive solvent such as ammonia water or an aqueous solution of an amine compound to obtain a non-aqueous and aqueous coating composition of this invention. If the former composition is to be used as a vehicle for offset printing inks then said esterifying reaction may be carried out in the presence of higher fatty acids or rosin as an additional reactant in order to make the composition more oleophilic.

As the reactive solvents used herein there may be at least one crosslinkable monomer which has ethylenic unsaturation (reactive double bond or bonds) and are crosslinkable with the esterified copolymer resin. The crosslinkable monomers include (meth)acrylate type monomers such as pentaerithritol tetra(meth)acrylate, pentaerithritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate, alkyl (meth)acrylates wherein the alkyl has 1-18 carbon atoms, and glycidyl (meth)acrylate. The expression "(meth)acrylate" is intended to mean "acrylate or methacrylate" throughout this specification.

As the reactive solvents used herein there may also be ammonia water or an aqueous solution of an amine compound. The suitable amine compounds which may be contained in this aqueous solution, include the primary, secondary and tertiary organic amine compounds such as methylamine, ethylamine, ethylmethylamine, diethylamine, triethylamine, tert.-butylamine, monoethanolamine, diethanolamine and triethanolamine.

The ratio of amount between the esterified copolymer resin and reactive solvent used for the esterification may widely vary depending upon various factors such as the softening point of the esterified copolmer resin and may also be selected depending upon the purpose for which the resulting coating composition is used. The ratio by weight of the esterified copolymer to reactive solvent may preferably be from 80/20 to 20/80. The esterified copolymer may consist of the cyclopentadiene type compound units and maleic anhydride units in molar ratios of 30/70–99.9/0.1, preferably 40/60–80/20.

The amount of ammonia or an amine compound in the aqueous reactive solvent added to the esterified copolymer resin may be in the range of 0.1–3 mol, preferably 0.4–1.2 mol, per mol of the acid group of the resin. If desired, the aqueous solution containing ammonia or the amine compound may be further incorporated with a small amount of an organic solvent such as a lower alcohol (isopropanol for example).

The coating compositions of this invention are characterized by the fact that they are cured or dried very rapidly by their crosslinking reaction or polymerization caused under the action of heat or radiation, this rendering them very suitable for use as a vehicle for paints or printing inks. In this curing the reactive solvent used is combined with the esterified copolymer resin as a component thereof by the crosslinking reaction therebetween without the evaporation of the reactive solvent unlike usual volatile organic solvents, thereby raising no problems of environmental pollution caused by the evaporation of organic solvents. If the coating compositions are the aqueous ones and are used as a vehicle for paints or printing inks, they will form a very excellently waterproof coating. Therefore, aqueous printing inks prepared by incorporating the coating composition of this invention with a pigment are advantageous in that they as compared with conventional aqueous ones will exhibit remarkably satisfactory water resistance after printed on the surface of a material for printing and then cured. The aqueous coating compositions may be dried or cured even if they are applied to a material and left as they are (without further treatment); however, it is preferable to dry the aqueous compositions under the action of heat or radiation soon after their application in order to shorten the time necessary for drying them and, in this case, there is obtained a coating having a more satisfactory water resistance than is obtained in the former case, thus obtaining the dual merit.

When the coating compositions are employed as a vehicle for paints or printing inks, they may be incorporated with a cure accelerator to accelerate their curing, this being preferred in many cases. The cure accelerators used in curing the coating composition under the action of heat may be an organic peroxide, may be a combination of an organic peroxide with a decomposition accelerator or may be a certain ketonic resin. In addition, the cure accelerators used in curing the coating composition under the action of ultraviolet rays may be a sensitizer such as a benzoin ether, benzophenone or Michler's ketone.

This invention will be further detailed by reference to the following Examples wherein all parts are by weight.

EXAMPLE 1

A 300-ml autoclave with a stirrer was charged with 84 g of dicyclopentadiene (DCPD) of 97% purity, 56 g of maleic anhydride and 60 g of commercially available xylenes to form a mixture which was reacted at 270° C. for one hour. After the completion of the reaction, the autoclave was cooled and the reaction mixture was then distilled to remove therefrom the unreacted monomer, low polymers and xylenes thereby obtaining 124 g of a resin (I) having a softening point of 92.5° C. and an acid value of 226.

To a three-necked flask were added 50 g of the resin (I), 22.3 g of 2-hydroxyethyl acrylate and 0.1 g of phenothiazine to form a mixture which was reacted at 100°

C. for 6 hours thereby to obtain a resin (I-E). Sixty grams of the resin (I-E) were dissolved in 50 g of trimethylolpropane triacrylate (TMPTA) to obtain a varnish (I-E-V). Using the varnish so obtained, inks A and B were prepared in the following formulations.

| Ink A (Curable by the radiation of ultraviolet rays) | |
| --- | --- |
| Lionol blue - SM (Trademark) (Phthalocyanine pigment produced by Toyo Ink Mfg. Co., Ltd.) | 18 Parts |
| Varnish (I-E-V) | 63 Parts |
| Vaseline | 3 Parts |
| TMPTA | 1 Parts |
| Benzophenone | 15 Parts |
| Total | 100 Parts |
| Inkometer value | 6.5/400 rpm 30° C. |
| Spreadmeter value | 20.0/25° C. |
| Ink B (Curable by heat) | |
| Carmine 6B (T) (Monoazo pigment produced by Toyo Ink Mfg. Co., Ltd.) | 16 Parts |
| Varnish (I-E-V) | 63 Parts |
| Wax Compound* | 5 Parts |
| Magie oil #470 | 6 Parts |
| Cylonox** (Trademark) (Peroxide produced by Kayaku Nooley) | 5 Parts |
| Co drier (Co:4%) | 5 Parts |
| Total | 100 Parts |
| Inkometer value | 7.0/400 rpm 30° C. |
| Spreadmeter value | 19.0/25° C. |

*A dispersion of 27 parts of microcrystalline wax in 73 parts of Magie oil
**Peroxide is blended with the other materials soon before the resulting ink is used. This applies to the following Examples.

The ink A so prepared was printed on art paper (or slick paper) in the amount of 25 mg/100 cm$^2$ by the use of a RI tester (produced by Akira Works) and the printed paper was passed 10 cm below a high pressure ultraviolet lamp (Trademark: Toshiba H 2000 L) at a velocity of 10 m/min. whereby the ink so printed was cured perfectly.

EXAMPLE 2

To an autoclave were added 105 g of DCPD of 97% purity, 35 g of maleic anhydride and 60 g of commercially available xylenes to form a mixture which was then reacted at 270° C. for two hours. After the end of the reaction, the reaction mixture was treated in the same manner as in Example 1 thereby to obtain 105 g of a resin (II) having a softening point of 74.0° C. and an acid value of 205.

Then, 40 g of the resin (II), 16 g of N-methylolacrylamide and 0.05 g of hydroquinone were introduced into a three-necked flask to form a mixture which was reacted at 100° C. for 3 hours while blowing air into the flask thereby to produce a resin (II-E). Fifty grams of the resin (II-E) were dissolved in 30 g of diethylene glycol diacrylate (DEGDA) to obtain a varnish (II-E-V). Employing the varnish (II-E-V), an ink C was prepared in accordance with the same formulation as the ink A in Example 1.

The ink C so prepared was printed under the same conditions as in Example 1 and the printed paper obtained was passed at a velocity of 12 m/min. while being radiated by ultraviolet rays as in Example 1, whereby the ink so printed was cured perfectly.

EXAMPLE 3

A three-necked flask was charged with 80 g of the resin (I) as obtained in Example 1, 80 g of glycidyl methacrylate, 0.06 g of phenothiazine and 0.5 g of triethylamine to form a mixture which was then reacted at 100° C. for 4 hours thereby obtaining a semi-solid resin (III-E). Fifty grams of the resin (III-E) were incorporated with 20 g of TMPTA to obtain a varnish (III-E-V) having a viscosity of 750 poise. Using the varnish (III-E-V), an ink D was prepared in accordance with the same formulation as the ink A of Example 1.

The ink D was printed and then subjected to the radiation of ultraviolet rays while passing the printed paper at a velocity of 12 m/min. under the radiation of ultraviolet rays under the same conditions as Example 1, whereby the ink so printed was cured perfectly. Separately, the ink D as prepared was kneaded with Michler's ketone in the amount of 5% by weight of the ink and the resulting mixed ink was then subjected to the same curing test as in Example 1 except that the mixture was passed at a velocity of 20 m/min. under the radiation of ultraviolet rays, whereby the mixed ink was cured perfectly.

EXAMPLE 4

To a 3-liter autoclave provided with a stirrer were added 980 g of dicylopentadiene (DCPD) of 97% purity, 420 g of maleic anhydride and commercially available xylenes to form a mixture which was then reacted at 250° C. for two hours. After the end of the reaction, the autoclave was cooled and the reaction mixture was then distilled to remove therefrom the unreacted monomer, low polymers and xylenes thereby to obtain 1120 g of a resin (IV) having a softening point of 110° C. and an acid value of 214.

A three-necked flask was then charged with 50 g of the resin (IV), 20 g of 2-hydroxyethyl acrylate and 0.1 g of phenothiazine to form a mixture which was then reacted at 100° C. for 9 hours thereby obtaining a resin (IV-E). Fifty grams of the resin (IV-E) were dissolved in 59 g of 3.6% ammonia water to obtain a varnish (IV-E-V) having a viscosity of 57 centipoise (25° C.) and a pH value of 7.5. Using the varnish (IV-E-V), there were prepared inks F and G respectively having the following compositions.

| Ink F (Curable by the radiation of ultraviolet rays) | |
| --- | --- |
| Varnish (IV-E-V) | 81 Parts |
| Carbon black | 12 Parts |
| Prussian blue | 2 Parts |
| Benzoin methyl ether | 5 Parts |
| pH 7.5, Viscosity Sahn cup No. 4 (25° C.) 12"2 | |
| Ink G (Curable by heat) | |
| Varnish (IV-E-V) | 86 Parts |
| Carbon black | 12 Parts |
| Prussian blue | 2 Parts |
| Dicumyl peroxide | 0.1 Part |
| pH 7.5, Viscosity Sahn cup No. 4 (25° C.) 12"0 | |

The ink F so prepared was printed on art paper by the use of a gravure proof printer and the printed paper was dried by being passed at a velocity of 10 m/min. 10 cm below a high pressure ultraviolet lamp (Trademark: Toshiba H 2000 L). Two kinds of printed paper in wet state were tested for water resistance by using a Southerland rub tester. The result is that after the test, the printed paper dried by the radiation of ultraviolet rays was maintained substantially unchanged without impairment of the printed portions thereof, while the ink F printed on art paper and dried without being radiated by ultraviolet rays was remarkably impaired. From this result it is seen that the ultraviolet radiation remarkably improved the ink in water resistance.

The ink G was likewise printed on art paper by the use of a gravure proof printer and then dried in an electrical oven at 230° C. for three seconds. The printed paper so heat dried was tested for water resistance with the result that it exhibited very excellent water resistance.

EXAMPLE 5

One hundred grams of the resin (IV) obtained in Example 4, 20 g of N-methylolacrylamide and 0.1 g of hydroquinone were mixed with one another to form a mixture which was then reacted at 100° C. for 10 hours thereby obtaining a resin (V-E). One hundred grams of the resin (V-E) were dissolved in a mixed solvent containing 90 g of a 3.6% ammonia water and 20 g of isopropyl alcohol to obtain a varnish (V-E-V) having a viscosity of 40 centipoise and a pH value of 8.0. Using this varnish, there was prepared an ink H having the following formulation.

| Ink H | |
|---|---|
| Varnish (V-E-V) | 83 Parts |
| Carbon black | 10 Parts |
| Prussian blue | 2 Parts |
| Benzophenone | 5 Parts |

The ink H so prepared was printed on art paper by using a gravure proof printer and the printed paper was radiated for two seconds by a high pressure ultraviolet lamp 10 cm positioned 10 cm apart from the printed paper. The printed paper so radiated was tested for water resistance by the use of the same wet-type Southerland rub tester as used in Example 4 with the result that it exhibited very excellent water resistance.

EXAMPLE 6

Seventy grams of the resin (IV) as obtained in Example 4, 50 g of glycidyl methacrylate, 0.1 g of benzoquinone and 1 g of triethylamine were mixed with one another to form a mixture which was then reacted at 110° C. for 8 hours thereby to obtain a resin (VI-E). Fifty (50) grams of the resin (VI-E) were dissolved in 50 g of a 3.0% ammonia water to obtain a varnish (VI-E-V) having a viscosity of 45 centipoise and a pH value of 7.5. Using this varnish, there was prepared an ink J having the following composition.

| Ink J | |
|---|---|
| Varnish (VI-E-V) | 80 Parts |
| Carbon black | 13 Parts |
| Prussian blue | 2 Parts |
| Benzoin methyl ether | 5 Parts |

The ink J so prepared was printed on art paper by using a gravure proof printer and the printed paper was radiated for 3 seconds by a high pressure ultraviolet lamp positioned 10 cm apart from the printed paper. The printed paper so radiated was tested for water resistance by the use of the same Southerland rub tester as used in Example 4 and, as a result, it exhibited very excellent water resistance.

What is claimed is:

1. A coating composition curable under the action of heat or radiation, consisting essentially of (A) an esterified copolymer resin of (I) a starting copolymer resin of (a) at least one cyclopentadiene type monomer and (b) maleic anhydride and (II) at least one compound selected from the group consisting of those represented by the formulae (1) and (2)

or

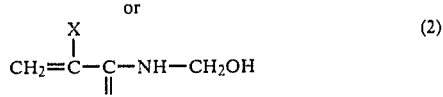

wherein X is hydrogen or —CH$_3$ and R is

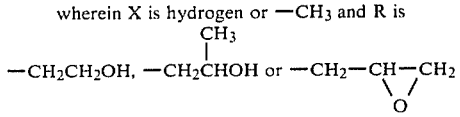

and (B) a reactive solvent for said esterified copolymer resin, the reactive solvent being a monomer capable of reaction therewith under the action of heat or radiation being a (meth)acrylate type monomer selected from the group consisting of pentaerythritol tetra(meth)acrylate, pentaerythritol tri(meth)acrylate, trimethylolproprane tri(meth)acrylate, ethylene glycol di(methyl)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate, an alkyl (meth)acrylate in which the alkyl has 1 to 18 carbon atoms and a compound in aqueous solution selected from the group consisting of ammonia, methylamine, ethylamine, ethylemethylamine, diethylamine, triethylamine, tert.-butylamine, monoethanolamine, diethanolamine and triethanolamine.

2. A coating composition curable under the action of heat or radiation, consisting essentially of (A) a substantially completely esterified copolymer resin of (I) a starting copolymer resin of (a) at least one cyclopentadiene type monomer selected from the group consisting of dicyclopentadiene, tricyclopentadiene, tetracyclopentadiene and lower alkyl substitution products thereof in which the alkyl has 1–3 carbon atoms and (b) maleic anhydride and (II) at least one compound selected from the group consisting of those represented by the formulae (1) and (2)

or

wherein X is hydrogen or —CH$_3$ and R is

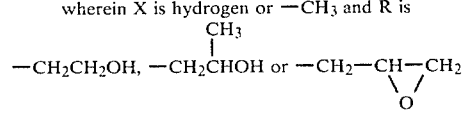

and (B) a reactive solvent for the coating composition wherein said solvent is selected from the group consisting of a (meth) acrylate type monomer selected from the group of pentaerythritol tetra(meth)acrylate, pentaerythritol tri(meth)acrylate, trimethylolpropane tri(meth)acrylate, ethylene glycol di(meth)acrylate, diethylene glycol di(meth)acrylate, 1, 3-butanediol di(meth-)acrylate, 1, 4-butanediol di(meth)acrylate, 1,6-hexanediol (meth)acrylate, 2-hydroxyethyl (meth)acrylate, 2-hydroxypropyl (meth)acrylate, an alkyl (meth)acrylate in which the alkyl has 1 to 18 carbon atoms and a compound in aqueous solution selected from the group consisting of ammonia, methylamine, ethylamine, ethylmethylamine, diethylamine, triethylamine, tert.-butylamine, monoethanolamine, diethanolamine and triethanolamine.

3. A coating composition according to claim 1, wherein the cyclopentadiene type monomer is a member selected from the group consisting of cyclopentadiene, dicyclopentadiene, tricyclopentadiene, tetracyclopentadiene and lower alkyl substitution products thereof in which the alkyl has 1-3 carbon atoms.

4. A coating composition according to claim 1, wherein the esterified copolymer resin (A) and the reactive solvent (B) are present in ratios by weight of from 80:20 to 20:80.

5. A coating composition according to claim 1, wherein the esterified copolymer resin (A) and the compound (B) in aqueous solution are present in amounts of 0.1-3 mol per mol of the acid group of the resin (A).

6. A coating composition according to claim 1, wherein the molar ratio of the cyclopentadiene type monomer to the maleic anhydride used in forming said starting copolymer resin (I) is in the range of from 40:60 to 80:20.

7. The coating composition according to claim 1, wherein said copolymer resin (I) of the cyclopentadiene monomer and the maleic acid is substantially completely esterified by said compound of formula (1) or (2).

8. A coating composition curable under the action of heat or radiation, consisting essentially of (A) a substantially completely esterified copolymer resin of (I) a starting copolymer resin of at least one cyclopentadiene type monomer and maleic anhydride and (II) at least one compound selected from the group consisting of those represented by the formulae (1) and (2)

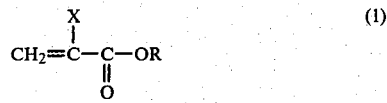
    (1)

or

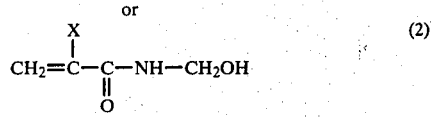
    (2)

wherein X is hydrogen or —CH₃ and R is

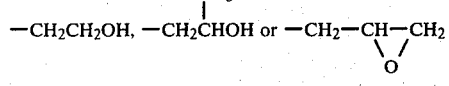

and (B) a reactive solvent for said esterified copolymer resin, the reactive solvent capable of reaction therewith under the action of heat or radiation wherein said solvent is a (meth)acrylate type monomer selected from the group consisting of pentaerythritol tetra(meth)acrylate, pentaerythritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate and an alkyl (meth)acrylate in which the alkyl has 1 to 18 carbon atoms.

9. A coating composition curable under the action of heat or radiation, consisting essentially of (A) a substantially completely esterified copolymer resin of (I) a starting copolymer resin of at least one cyclopentadiene type monomer and maleic anhydride and (II) at least one compound selected from the group consisting of those represented by the formulae (1) and (2)

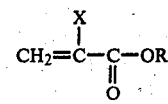
    (1)

or

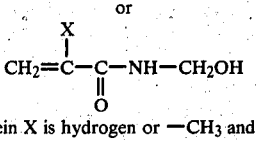
    (2)

wherein X is hydrogen or —CH₃ and R is

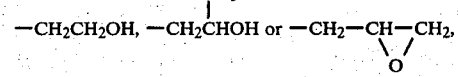

and (B) a reactive solvent for said esterified copolymer resin, the reactive solvent capable of reaction therewith under the action of heat or radiation being a compound in aqueous solution selected from the group consisting of ammonia, methylamine, ethylamine, ethylmethylamine, diethylamine, triethylamine, tert.-butylamine, monoethanolamine, diethanolamine and triethanolamine.

10. A process for preparing a coating composition curable under the action of heat or radiation comprising the steps of:

reacting at least one cyclopentadiene type monomer with maleic anhydride at 150°-350° C. for a time sufficient to produce a starting copolymer resin having a softening point of 50°-250° C., esterifying the thus produced copolymer resin with at least one compound selected from the group consisting of these represented by the formulae (1) and (2)

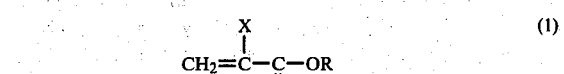
    (1)

or

    (2)

wherein X is hydrogen or —CH₃ and R is

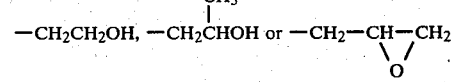

to produce an esterified copolymer resin and
dissolving the thus esterified copolymer resin in a reactive solvent capable of reaction therewith under the action of heat or radiation to produce the coating composition wherein said solvent is a (meth)acrylate type monomer selected from the group consisting of pentaerythritol tetra(meth)

acrylate, pentaerythritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate, an alkyl (meth)acrylate in which the alkyl has 1 to 18 carbon atoms and a compound in aqueous solution selected from the group consisting of ammonia, methylamine, ethylamine, ethylmethylamine, diethylamine, triethylamine, tert.-butylamine, monoethanolamine, diethanolamine and triethanolamine.

11. A process for preparing a coating composition curable under the action of heat or radiation, comprising the steps of:

reacting (a) at least one cyclopentadiene type monomer selected from the group consisting of dicyclopentadiene, tricyclopentadiene, tetracyclopentadiene and lower alkyl substitution products thereof in which the alkyl has 1-3 carbon atoms with (b) maleic anhydride at 150°–350° C. for a time sufficient to produce a starting copolymer resin having a softening point of 50°–250° C., esterifying the thus produced copolymer resin with at least one compound selected from the group consisting of those represented by the formulae (1) and (2)

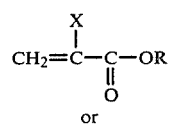

or

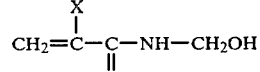

wherein X is hydrogen or —CH₃ and R is

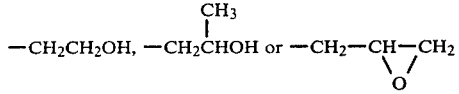

to produce an esterified copolymer resin and dissolving the thus esterified copolymer resin in a reactive solvent to produce the coating composition wherein said solvent is selected from the group consisting of a (meth)acrylate type monomer selected from the group of pentaerythritol tetra(meth)acrylate, pentaerythritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate, an alkyl (meth)acrylate in which the alkyl has 1 to 18 carbon atoms and a compound in aqueous solution selected from the group consisting of ammonia, methylamine, ethylamine, ethylmethylamine diethylamine, triethylamine, tert.-butylamine, monoethanolamine, diethanolamine and triethanolamine.

12. A process according to claim 10, wherein the cyclopentadiene type monomer is a member selected from the group consisting of cyclopentadiene, dicyclopentadiene, tricyclopentadiene, tetracyclopentadiene and lower alkyl substitution products thereof in which the alkyl has 1-3 carbon atoms.

13. A process according to claim 10, wherein the cyclopentadiene type monomer as reacted with maleic anhydride in molar ratios of from 40:60 to 80:20 and the starting copolymer resin is esterified with the compound of the formula (1) or (2) in amounts of 0.5–2 mol per mol of the acid anhydride group of the starting copolymer resin.

14. A process according to claim 10, wherein the cyclopentadiene type monomer is reacted with maleic anhydride in molar ratios of from 40:60 to 80:20 and the starting copolymer resin is esterified with the compound of the formula (1) or (2) in amounts of 0.5–1.5 mol per mol of the acid anhydride group of the starting copolymer resin.

15. The process according to claim 10, wherein the cyclopentadiene type monomer is reacted with maleic anhydride in a molar ratio of from 40:60 to 80:20.

16. The process according to claim 10, wherein said copolymer resin of cyclopentadiene type monomer and maleic acid is substantially completely esterified with the compound of formula (1) or (2), said compound being used in amounts of 0.5 to 2 mol per mol of the acid anhydride group of said copolymer resin.

17. A process for preparing a coating composition curable under the action of heat or radiation comprising the steps of:

reacting at least one cyclopentadiene type monomer with maleic anhydride at 150°–350° C. for a time sufficient to produce a starting copolymer resin having a softening point of 50°–250° C., esterifying the thus produced copolymer resin with at least one compound selected from the group consisting of those represented by the formulae (1) and (2)

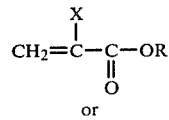

or

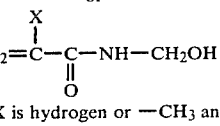

wherein X is hydrogen or —CH₃ and R is

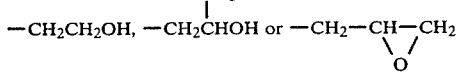

to produce an esterified copolymer resin and dissolving the thus esterified copolymer resin in a reactive solvent capable of reaction therewith under the action of heat or radiation to produce the coating composition wherein said solvent is a (meth)acrylate type monomer selected from the group consisting of pentaerythritol tetra(meth)acrylate, pentaerythritol tri(meth)acrylate, trimethylolpropane tri(meth)acrylate, ethylene glycol di(meth)acrylate, diethylene glycol di(meth)acrylate, 1,3-butanediol di(meth)acrylate, 1,4-butanediol di(meth)acrylate, 1,6-hexanediol (meth)acrylate, 2-hydroxyethyl (meth)acrylate, 2-hydroxypropyl (meth)acrylate, an alkyl (meth)acrylate in which the alkyl has 1 to 18 carbon atoms.

18. A process for preparing a coating composition curable under the action of heat or radiation comprising the steps of:

reacting at least one cyclopentadiene type monomer with maleic anhydride at 150°–350° C. for a time sufficient to produce a starting copolymer resin having a softening point of 50°–250° C., esterifying the thus produced copolymer resin with at least one compound selected from the group consisting of those represented by the formulae (1) and (2)

$$CH_2=\overset{X}{\underset{}{C}}-\underset{\underset{O}{\parallel}}{C}-OR \quad (1)$$

or $$CH_2=\overset{X}{\underset{}{C}}-\underset{\underset{O}{\parallel}}{C}-NH-CH_2OH \quad (2)$$

wherein X is hydrogen or $-CH_3$ and R is $-CH_2CH_2OH$, $-CH_2\overset{CH_3}{\underset{}{C}}HOH$ or $-CH_2-CH-CH_2\overset{}{\underset{O}{\diagdown\diagup}}$ to produce an esterified copolymer resin and dissolving the thus esterified copolymer resin in a reactive solvent capable of reaction therewith under the action of heat or radiation to produce the coating composition wherein said solvent is a compound in aqueous solution selected from the group consisting of ammonia, methylamine, ethylamine, ethylmethylamine, diethylamine, triethylamine, tert.-butylamine, monoethanolamine, diethanolamine and triethanolamine.

* * * * *